United States Patent
Nagasaka et al.

(10) Patent No.: US 9,668,205 B2
(45) Date of Patent: May 30, 2017

(54) USER TERMINAL AND COMMUNICATION CONTROL METHOD

(71) Applicant: KYOCERA CORPORATION, Kyoto (JP)

(72) Inventors: Yushi Nagasaka, Yokohama (JP); Masato Fujishiro, Yokohama (JP); Henry Chang, San Diego, CA (US)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 15/047,289

(22) Filed: Feb. 18, 2016

(65) Prior Publication Data

US 2016/0165532 A1 Jun. 9, 2016

Related U.S. Application Data

(63) Continuation of application No. PCT/JP2015/063260, filed on May 8, 2015.

(Continued)

(51) Int. Cl.
*H04W 4/00* (2009.01)
*H04W 48/18* (2009.01)
*H04W 48/16* (2009.01)
*H04W 84/12* (2009.01)
*H04W 88/06* (2009.01)
*H04W 48/14* (2009.01)

(52) U.S. Cl.
CPC ............ *H04W 48/18* (2013.01); *H04W 48/14* (2013.01); *H04W 48/16* (2013.01); *H04W 84/12* (2013.01); *H04W 88/06* (2013.01)

(58) Field of Classification Search
CPC ... H04W 48/06; H04W 4/00; H04W 36/0022; H04W 36/0066; H04W 48/18;

(Continued)

(56) References Cited

U.S. PATENT DOCUMENTS 9,313,697 B2 * 4/2016 Xiang ............... H04W 36/0066
2015/0119101 A1 * 4/2015 Cui ........................ H04W 48/18
455/525

(Continued)

FOREIGN PATENT DOCUMENTS

WO 2013/138711 A1 9/2013

OTHER PUBLICATIONS

SA2; "Reply LS on CN impacts of RAN2 solutions for WLAN/3GPP radio interworking"; 3GPP TSG RAN WG2 Meeting #85bis; R2-141067; Mar. 31-Apr. 4, 2014; pp. 1-2; Valencia, Spain.

(Continued)

*Primary Examiner* — Hanh N Nguyen
(74) *Attorney, Agent, or Firm* — Studebaker & Brackett PC (57) ABSTRACT

A user terminal capable of using an Evolved-UMTS Terrestrial Radio Access Network (E-UTRAN) and a Wireless Local Area Network (WLAN), includes: a storage configured to store a Radio Access Network (RAN) rule for selecting a network, among the E-UTRAN and the WLAN, to be used in a unit of an Access Point Name (APN); a receiver configured to receive an Access Network Discovery and Selection Function (ANDSF) rule for selecting a network, among the E-UTRAN and the WLAN, to be used; and a controller configured to select a selection rule, from among the ANDSF rule and the RAN rule, to be applied to change the network, wherein the controller selects the RAN rule in a case where the user terminal has both the ANDSF rule and the RAN rule and an Inter System Routing Policy (ISRP) is not configured. The ISRP is a function, in the ANDSF rule, for selecting a network, among the E-UTRAN and the WLAN, to be used in a unit of an Internet Protocol (IP) flow.

3 Claims, 9 Drawing Sheets

Related U.S. Application Data (60) Provisional application No. 61/990,918, filed on May 9, 2014.

(58) Field of Classification Search
CPC ..... H04W 18/20; H04W 72/00; H04W 48/16; H04W 28/08; H04W 84/12; H04W 36/08; H04W 28/0289; H04W 28/02687; H04W 28/0252; H04W 48/14
USPC ........ 370/230, 329, 338, 331, 395; 455/453, 455/456.1
See application file for complete search history.

(56) References Cited

U.S. PATENT DOCUMENTS

| | | | |
|---|---|---|---|
| 2015/0195759 A1* | 7/2015 | Sirotkin | H04W 8/005 370/331 |
| 2016/0066251 A1* | 3/2016 | Sirotkin | H04W 48/14 370/328 |

OTHER PUBLICATIONS

Intel Corporation; "Idle mode procedures of WLAN/3GPP Radio Interworking for LTE"; 3GPP TSG-RAN WG2 Meeting #85bis; R2-141846; Mar. 31-Apr. 4, 2014; pp. 1-3; Valencia, Spain.

Intel Corporation; "New Study Item Proposal on WLAN/3GPP Radio Interworking"; 3GPP TSG-RAN Meeting #57; RP-1201455; Sep. 13-15, 2012; pp. 1-5; Chicago, USA.

Alcatel-Lucent, Alcatel-Lucent Shanghai Bell; "Interaction between ANDSF policies and RAN rules"; SA WG2 Meeting #102; S2-141105; Mar. 24-28, 2014; pp. 1-4; St. Julian's, Malta.

Huawei, HiSilicon; "Definition of RAN rules and ANDSF rules and their interworking"; 3GPP TSG-RAN WG2 Meeting #85bis; R2-141654; Mar. 31-Apr. 4, 2014; pp. 1-4; Valencia, Spain.

Intel Corporation; "APN level Offloading without ANDSF"; SA WG2 Meeting #102; S2-141136; Mar. 24-28, 2014; pp. 1-6; St Julian's, Malta.

Alcatel-Lucent, Alcatel-Lucent Shanghai Bell; "Discussion on framework for selection of 3GPP/WiFi interworking method including OPI definition"; SA WG2 Meeting #102; S2-141104; Mar. 24-28, 2014; pp. 1-4; St. Julian's, Malta.

International Search Report; issued in PCT/JP2015/063260; Jul. 28, 2015.

Written Opinion; issued in PCT/JP2015/063260; Jul. 28, 2015.

Ericsson, "Coexistence between AS mechanism and ANDSF," 3GPP TSG-RAN WG2 #85bis, Tdoc R2-141642, Valencia, Spain, Mar. 31, 2014-Apr. 4, 2014, 5 pp.

SA2, Reply LS on CN Impacts of RAN2 solutions for WLAN/3GPP radio interworking, 3GPP TSG-SA WG2 Meeting #102, S2-141506, Malta, Malta, Mar. 24, 2014-Mar. 28, 2014, 3 pp.

JP Office Action dated Mar. 21, 2017 from corresponding JP Appl No. 2016-517931, with concise statement of relevance, 4 pp.

* cited by examiner

USER TERMINAL AND COMMUNICATION CONTROL METHOD

RELATED APPLICATIONS

This application is a continuation application of international application PCT/JP2015/063260, filed May 8, 2015, which claims benefit of U.S. provisional application 61/990,918, filed May 9, 2014, the entirety of both applications hereby expressly incorporated by reference.

TECHNICAL FIELD

The present disclosure relates to a user terminal used in a cellular communication system capable of cooperating with a wireless LAN scheme (WLAN scheme), and relates also to a communication control method.

BACKGROUND ART

In recent years, the use of a user terminal including a cellular communication unit and a WLAN communication unit (a so-called dual terminal) is widely spread. Furthermore, the number of WLAN access points (hereinafter briefly referred to as an "access point") managed by an operator of a cellular communication scheme increases.

To respond to this situation, ANDSF (Access Network Discovery and Selection Function) is being standardized to make efficient an access point discovery process by a user terminal.

Further, in 3GPP (3rd Generation Partnership Project) which is a project aiming to standardize a cellular communication system, it is planned to study a technology enabling strengthening of cooperation in wireless access network (RAN) level between a cellular communication system and a WLAN system (see Non Patent Document 1).

One of the objects of such a technology is to establish a good balance at a load level between a cellular base station and an access point by improving the usage of an access point.

In the ANDSF, an ANDSF server arranged in a core network provides a user terminal with information on WLAN by way of a NAS (Non Access Stratum) message. The user terminal selects the cellular base stations and the access points on the basis of the information provided from the ANDSF server to establish a balance at a load level.

Further, the user terminal is notified of a RAN rule set in a cellular RAN. The RAN rule is used to establish a load balance between the cellular base station and the access point in response to an actual load situation, etc., of the cellular base station.

PRIOR ART DOCUMENTS

Non Patent Document

[Non Patent Document 1] 3GPP contribution "RP-1201455"

SUMMARY

A user terminal according to one embodiment is capable of using an Evolved-UMTS Terrestrial Radio Access Network (E-UTRAN) and a Wireless Local Area Network (WLAN), includes: a storage configured to store a Radio Access Network (RAN) rule for selecting a network, among the E-UTRAN and the WLAN, to be used in a unit of an Access Point Name (APN); a receiver configured to receive an Access Network Discovery and Selection Function (ANDSF) rule for selecting a network, among the E-UTRAN and the WLAN, to be used; and a controller configured to select a selection rule, from among the ANDSF rule and the RAN rule, to be applied to change the network, wherein the controller selects the RAN rule in a case where the user terminal has both the ANDSF rule and the RAN rule and an Inter System Routing Policy (ISRP) is not configured. The ISRP is a function, in the ANDSF rule, for selecting a network, among the E-UTRAN and the WLAN, to be used in a unit of an Internet Protocol (IP) flow.

A user terminal according to one embodiment is capable of using a plurality of radio access schemes including a cellular and a WLAN. The user terminal includes: a receiver configured to receive a first selection rule which is a rule for selecting a radio access scheme to be used among the cellular and the WLAN in a unit of IP flow used in communication with APN; a storage configured to store a second selection rule which is a rule for selecting a radio access scheme to be used among the cellular and the WLAN in a unit of the APN; and a controller configured to select a selection rule applied to change a radio access scheme from among the first selection rule and the second selection rule, when the user terminal has both the first selection rule and the second selection rule.

In one embodiment, the controller selects the second selection rule from among the first selection rule and the second selection rule, when a function is not set in the first selection rule, the function designating a radio access scheme to be used.

In one embodiment, the controller selects the selection rule applied to change the radio access scheme from among the first selection rule and the second selection rule, on the basis of an area in which the user terminal exists.

In one embodiment, the first selection rule is configured to be set by a home network of the user terminal. The controller selects the second selection rule from among the first selection rule and the second selection rule, when the user terminal is not capable of using the first selection rule effectively because the user terminal is in roaming.

In one embodiment, the controller selects the second selection rule from among the first selection rule and the second selection rule, when the user terminal is in roaming and the function is not set in the first selection rule, the function designating a radio access scheme to be used.

In one embodiment, the second selection rule is configured to determine whether to change a radio access scheme to be used, on the basis of at least one of load status and radio quality of a radio access scheme currently used and a candidate of changed radio access scheme.

A user terminal according to one embodiment is capable of using a plurality of radio access schemes including a cellular and a WLAN. The user terminal includes: a receiver configured to receive information indicating whether an offload per APN from the cellular to the WLAN is capable; a storage configured to store a selection rule which is a rule applied in selecting a radio access scheme among the cellular and the WLAN; and a controller configured to determine whether to change a radio access scheme to be used for communication with the APN among the cellular and the WLAN on the basis of the information and the selection rule. The controller switches, from the WLAN to the cellular, a traffic belonging to an APN indicated by the information which indicates that an offload is capable.

A user terminal according to one embodiment is capable of using a plurality of radio access schemes including a cellular and a WLAN. The user terminal includes: a receiver configured to receive radio assistance information from a cellular base station; and a controller configured to select a radio access scheme by using a radio access scheme selection rule on the basis of the radio assistance information. The radio assistance information is generated from WLAN load information acquired from a WLAN node by the cellular base station.

A communication control method according to one embodiment is a method in a user terminal capable of using a plurality of radio access schemes including a cellular and a WLAN. The communication control method includes: receiving a first selection rule which is a rule for selecting a radio access scheme to be used among the cellular and the WLAN in a unit of IP flow used in communication with APN; storing a second selection rule which is a rule for selecting a radio access scheme to be used among the cellular and the WLAN in a unit of the APN; and selecting a selection rule applied to change a radio access scheme from among the first selection rule and the second selection rule, when the user terminal has both the first selection rule and the second selection rule.

A communication control method according to one embodiment is a method in a user terminal capable of using a plurality of radio access schemes including a cellular and a WLAN. The communication control method includes: receiving information indicating whether an offload per APN from the cellular to the WLAN is capable; storing a selection rule which is a rule applied in selecting a radio access scheme among the cellular and the WLAN; determining whether to change a radio access scheme to be used for communication with the APN among the cellular and the WLAN on the basis of the information and the selection rule; and switching, from the WLAN to the cellular, a traffic belonging to an APN indicated by the information which indicates that an offload is capable.

A communication control method according to one embodiment is a method in a user terminal capable of using a plurality of radio access schemes including a cellular and a WLAN. The communication control method includes: receiving radio assistance information from a cellular base station, the radio assistance information generated from WLAN load information acquired from a WLAN node by the cellular base station; and selecting a radio access scheme by using a radio access scheme selection rule on the basis of the radio assistance information.

DESCRIPTION OF EMBODIMENTS

[Overview of Embodiments]

A user terminal according to a first embodiment is capable of using a plurality of radio access schemes. The user terminal includes: a receiver that receives, from a network, a list in which priority of the radio access scheme to be used is set for each APN; a storage in which a radio access scheme selection rule that is a rule applied when a radio access scheme is selected, is stored; and a controller that determines on the basis of the list and the radio access scheme selection rule whether to change the radio access scheme to be used for connecting with the APN, and when changing, establishes the connection with the APN via a target radio access scheme to be changed, wherein when the APN is not listed in the list, the controller determines whether to change the radio access scheme to be used for the connection with the APN in accordance with a predetermined condition.

In the first embodiment, the controller may determine whether to switch a connection with the APN that is made via WLAN to a connection that is made via cellular.

In the first embodiment, the list may describe whether it is possible to switch the connection to the APN from via cellular to via WLAN.

A user terminal according to a second embodiment is capable of using a plurality of radio access schemes. The user terminal includes: a receiver that receives, from a network, a first selection rule that is a rule for selecting the radio access scheme used for each IP flow used in communication with an APN; a storage that stores a second selection rule that is a rule for selecting the radio access scheme used for each APN; and a controller that selects the radio access scheme by using the first selection rule and the second selection rule, and uses the selected radio access scheme to establish the connection with the APN, wherein the controller preferentially uses the first selection rule to change the radio access scheme, and when a predetermined condition is satisfied, the controller does not use the first selection rule and uses the second selection rule to change the radio access scheme.

In the second embodiment, in the first selection rule, when a function of designating the radio access scheme to be used is not set, the controller may determine that a predetermined condition is satisfied.

In the second embodiment, when a first selection rule is set so that the radio access scheme to be used is selected on the basis of at least either one of a time zone and a camp-on location, the controller may determine that a predetermined condition is satisfied.

In the second embodiment, the first selection rule is configured to be set by a home network of the user terminal, and when it is not possible to use the first selection rule as set because the user terminal is loaming, the controller may determine that a predetermined condition is satisfied.

In the second embodiment, the second selection rule may be configured to determine whether to change the radio access scheme to be used on the basis of at least either one of a load situation and radio quality of a currently used radio access scheme and a candidate radio access scheme to be changed.

A user terminal according to a third embodiment is capable of using a plurality of radio access schemes. The terminal includes: a receiver that receives radio assistance information from a base station of a first radio access scheme; and a controller that uses a radio access scheme selection rule set by using the radio assistance information when the radio access scheme is selected so as to select a radio access scheme, wherein the radio assistance information is generated from load information of the second radio access scheme acquired by the base station of the first radio access scheme from a base station of a second radio access scheme.

A communication control method according to a first embodiment is a method in a communication system including a user terminal capable of using a plurality of radio access schemes, the user terminal being configured to store a radio access scheme selection rule that is a rule applied when a radio access scheme is selected. The communication control method includes: a step of receiving from a network, by the user terminal, from a network, a list in which priority of the radio access scheme to be used is set for each APN; a step of determining, by the user terminal, whether to change the radio access scheme on the basis of the list and the radio access scheme selection rule; and a step of establishing, by the user terminal, a connection with the APN via a target radio access scheme to be changed, wherein when the APN is not listed in the list, the user terminal determines in accordance with a predetermined condition whether to change the radio access scheme to be used.

A communication control method according to a second embodiment is a method in a communication system including a user terminal capable of using a plurality of radio access schemes, the user terminal using a first selection rule that is a rule for selecting the radio access scheme to be used for each IP flow used in communication with APN and a second selection rule that is a rule for selecting the radio access scheme used for each APN so as to select a radio access scheme, the second selection rule being configured to be stored by the user terminal. The communication control method includes: a step of receiving, by the user terminal, the first selection rule from a network; a step of selecting, by the user terminal, the radio access scheme by using the first selection rule and the second selection rule; and a step of establishing, by the user terminal, a connection with the APN by using the selected radio access scheme, wherein the user terminal preferentially uses the first selection rule to change the radio access scheme, and when a predetermined condition is satisfied, the user terminal does not use the first selection rule and uses the second selection rule to change the radio access scheme.

A communication control method according to a third embodiment is a method in a communication system including a user terminal capable of using a plurality of radio access schemes. The method includes: a step of acquiring, by a base station of a first radio access scheme, load information of a base station of a second radio access scheme from the base station of the second radio access scheme; a step of generating, by the base station of the first radio access scheme, radio assistance information from the load information; and a step of notifying, by the base station of the first radio access scheme, the user terminal of the radio assistance information, wherein the user terminal sets a radio access scheme selection rule by using the radio assistance information, and selects the radio access scheme in accordance with the set selection rule.

[First Embodiment]

Below, with reference to the drawing, an embodiment will be described in which a cellular communication system (LTE system) configured to comply with the 3GPP standards is linked with a wireless LAN (WLAN) system.

(System Configuration)

Figure 1:
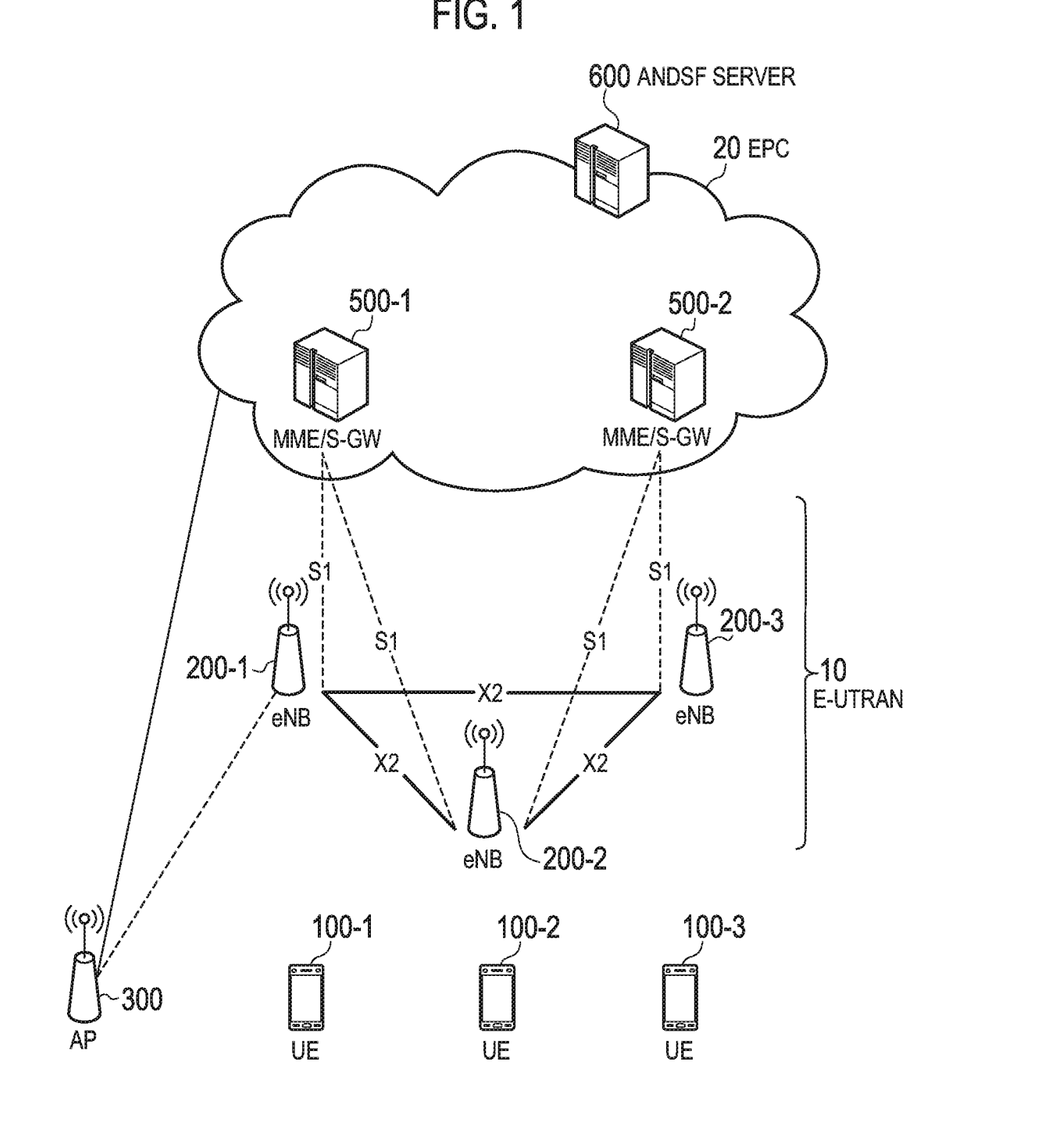
FIG. 1 is a system configuration diagram according to a first embodiment to a third embodiment.

FIG. 1 is a system configuration diagram according to a first embodiment. As shown in FIG. 1, a cellular communication system includes a plurality of UEs (User Equipments) 100, an E-UTRAN (Evolved-UMTS Terrestrial Radio Access Network) 10, and an EPC (Evolved Packet Core) 20. The E-UTRAN 10 corresponds to a radio access network (RAN). The EPC 20 corresponds to a core network.

The UE 100 is a mobile-type radio communication device and performs radio communication with a cell with which a connection is established. The UE 100 corresponds to a user terminal. The UE 100 is a terminal (dual terminal) that supports both communication schemes of cellular communication and WLAN communication.

The E-UTRAN 10 includes a plurality of eNBs 200 (evolved Nodes-B). The eNB 200 corresponds to a cellular base station. The eNB 200 manages one or a plurality of cells, and performs radio communication with the UE 100 with which a connection is established with a cell of the eNB 200. It is noted that the "cell" is used as a term indicating a minimum unit of a radio communication area, and is also used as a term indicating a function of performing radio communication with the UE 100. Further, the eNB 200 has a radio resource management (RRM) function, a routing function of user data, and a measurement control function for mobility control and scheduling, for example.

The eNBs 200 are connected with one another via an X2 interface. Further, the eNB 200 is connected via an S1 interface to an MME/S-GW 500 included in the EPC 20.

The EPC 20 includes a plurality of MMEs (Mobility Management Entities)/S-GWs (Serving-Gateways) 500. The MME is a network node that performs various mobility controls, etc., on the UE 100, and corresponds to a control station. The S-GW is a network node that performs control to transfer user data, and corresponds to a switching station.

The WLAN system includes a WLAN access point (hereinafter, briefly referred to as "AP") 300. The WLAN system is configured to comply with various IEEE 802.11 specifications, for example. The AP 300 communicates with the UE 100 in a frequency band (WLAN frequency band) different from a cellular frequency band. The AP 300 is connected, via a router, etc., to the EPC 20.

Further, in addition to a case where the eNB 200 and the AP 300 are individually located, the eNB 200 and the AP 300 may also be "Collocated". As one mode of the "Collocated", the eNB 200 and the AP 300 may be directly connected to each other through any interface of an operator.

The EPC 20 further includes an ANDSF server 600. The ANDSF server 600 manages information on WLAN (hereinafter, referred to as "ANDSF information"). The ANDSF server 600 provides the UE 100 with the WLAN related information by way of a NAS message.

Figure 2:
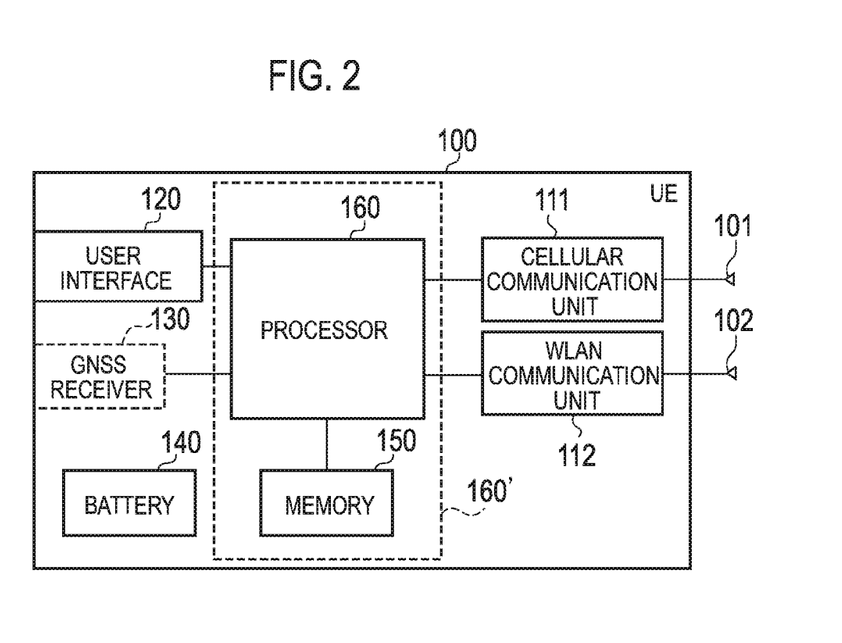
FIG. 2 is a block diagram of a UE (user terminal) according to the first embodiment to the third embodiment.
Figure 3:
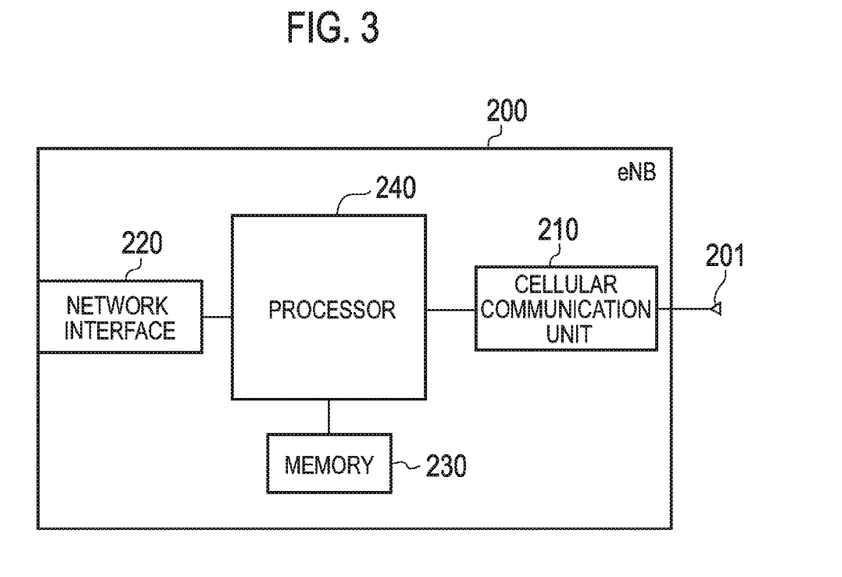
FIG. 3 is a block diagram of an eNB (cellular base station) according to the first embodiment to the third embodiment.
Figure 4:
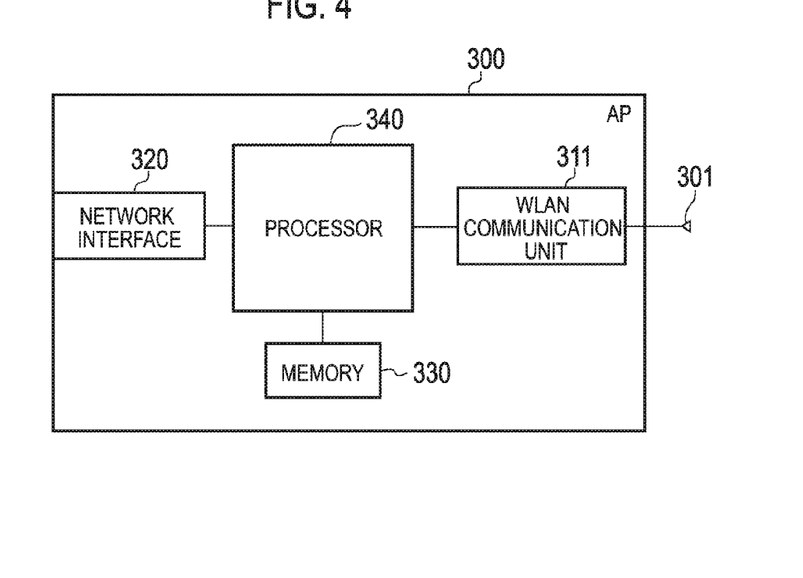
FIG. 4 is a block diagram of an AP (access point) according to the first embodiment and the third embodiment.

Next, configurations of the UE 100, the eNB 200, and the AP 300 will be described.

FIG. 2 is a block diagram of the UE 100. As shown in FIG. 2, the UE 100 includes: antennas 101 and 102; a cellular communication unit 111; a WLAN communication unit 112; a user interface 120; a GNSS (Global Navigation Satellite System) receiver 130; a battery 140; a memory 150; and a processor 160. The memory 150 and the processor 160 constitute a controller. The UE 100 may not have the GNSS receiver 130. Furthermore, the memory 150 may be integrally formed with the processor 160, and this set (that is, a chipset) may be called a processor 160'.

The antenna 101 and the cellular communication unit 111 are used for transmitting and receiving a cellular radio signal. The cellular communication unit 111 converts a baseband signal output from the processor 160 into the cellular radio signal, and transmits the same from the antenna 101. Further, the cellular communication unit 111 converts the cellular radio signal received by the antenna 101 into the baseband signal, and outputs the same to the processor 160.

The antenna 102 and the WLAN communication unit 112 are used for transmitting and receiving a WLAN radio signal. The WLAN communication unit 112 converts the baseband signal output from the processor 160 into a WLAN radio signal, and transmits the same from the antenna 102. Further, the WLAN communication unit 112 converts the WLAN radio signal received by the antenna 102 into a baseband signal, and outputs the same to the processor 160.

The user interface 120 is an interface with a user carrying the UE 100, and includes, for example, a display, a microphone, a speaker, and various buttons. Upon receipt of the input from a user, the user interface 120 outputs a signal indicating a content of the input to the processor 160. The GNSS receiver 130 receives a GNSS signal in order to obtain location information indicating a geographical location of the UE 100, and outputs the received signal to the processor 160. The battery 140 accumulates a power to be supplied to each block of the UE 100.

The memory 150 stores a program to be executed by the processor 160 and information to be used for a process by the processor 160. The processor 160 includes the baseband processor that performs modulation and demodulation, and encoding and decoding of the baseband signal and a CPU that performs various processes by executing the program stored in the memory 150. The processor 160 may further include a codec that performs encoding and decoding of sound and video signals. The processor 160 implements various processes and various communication protocols described later.

FIG. 3 is a block diagram of the eNB 200. As shown in FIG. 3, the eNB 200 includes an antenna 201, a cellular communication unit 210, a network interface 220, a memory 230, and a processor 240. The memory 230 and the processor 240 constitute a controller. Furthermore, the memory 230 may be integrally formed with the processor 240, and this set (that is, a chipset) may be called a processor 240'.

The antenna 201 and the cellular communication unit 210 are used for transmitting and receiving a cellular radio signal. The cellular communication unit 210 converts the baseband signal output from the processor 240 into the cellular radio signal, and transmits the same from the antenna 201. Furthermore, the cellular communication unit 210 converts the cellular radio signal received by the antenna 201 into the baseband signal, and outputs the same to the processor 240.

The network interface 220 is connected to the neighboring eNB 200 via an X2 interface and is connected to the MME/S-GW 500 via the S1 interface. Further, the network interface 220 is used for communication with the AP 300 via the EPC 20.

The memory 230 stores a program to be executed by the processor 240 and information to be used for a process by the processor 240. The processor 240 includes the baseband processor that performs modulation and demodulation, and encoding and decoding of the baseband signal and a CPU that performs various processes by executing the program stored in the memory 230. The processor 240 implements various processes and various communication protocols described later.

FIG. 4 is a block diagram of the AP 300. As shown in FIG. 4, the AP 300 includes an antenna 301, a WLAN communication unit 311, a network interface 320, a memory 330, and a processor 340. Furthermore, the memory 330 may be integrally formed with the processor 340, and this set (that is, a chipset) may be called a processor 340'.

The antenna 301 and the WLAN communication unit 311 are used for transmitting and receiving the WLAN radio signal. The WLAN communication unit 311 converts the baseband signal output from the processor 340 into the WLAN radio signal and transmits the same from the antenna 301. Further, the WLAN communication unit 311 converts the WLAN radio signal received by the antenna 301 into the baseband signal and outputs the same to the processor 340.

The network interface 320 is connected to the EPC 20 via a router, etc. Further, the network interface 320 is used for communication with the eNB 200 via the EPC 20.

The memory 330 stores a program executed by the processor 340 and information used for a process by the processor 340. The processor 340 includes the baseband processor that performs modulation and demodulation, and encoding and decoding of the baseband signal and a CPU that performs various processes by executing the program stored in the memory 330.

Figure 5:
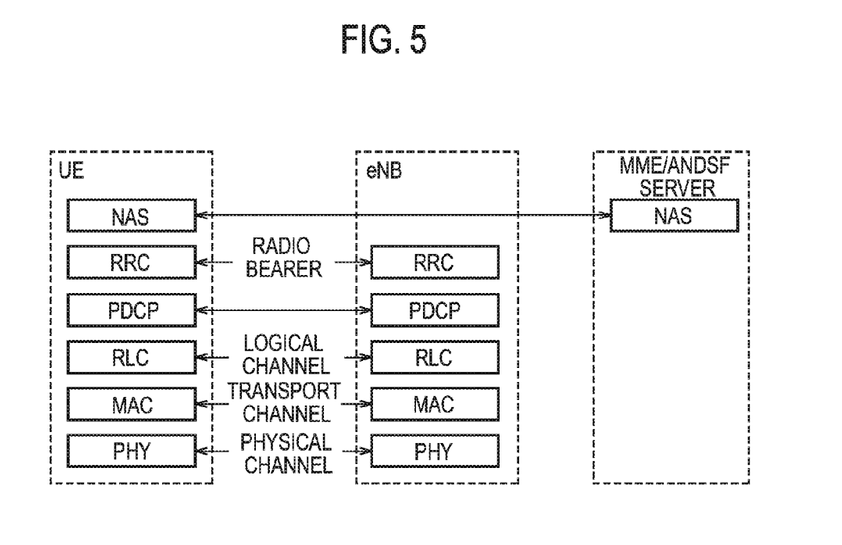
FIG. 5 is a protocol stack diagram of a radio interface in an LTE system.

FIG. 5 is a protocol stack diagram of a radio interface in the cellular communication system. As illustrated in FIG. 5, the radio interface protocol is classified into a layer 1 to a layer 3 of an OSI reference model, wherein the layer 1 is a physical (PHY) layer. The layer 2 includes a MAC (Media Access Control) layer, an RLC (Radio Link Control) layer, and a PDCP (Packet Data Convergence Protocol) layer. The layer 3 includes an RRC (Radio Resource Control) layer.

The PHY layer performs encoding and decoding, modulation and demodulation, antenna mapping and demapping, and resource mapping and demapping. Between the PHY layer of the UE 100 and the PHY layer of the eNB 200, data is transmitted via the physical channel.

The MAC layer performs preferential control of data, and a retransmission process and the like by hybrid ARQ (HARQ). Between the MAC layer of the UE 100 and the MAC layer of the eNB 200, data is transmitted via a transport channel. The MAC layer of the eNB 200 includes a scheduler for deciding a transport format (a transport block size, a modulation and coding scheme, and the like) of an uplink and a downlink, and an assigned resource block.

The RLC layer transmits data to an RLC layer of a reception side by using the functions of the MAC layer and the PHY layer. Between the RLC layer of the UE 100 and the RLC layer of the eNB 200, data is transmitted via a logical channel.

The PDCP layer performs header compression and decompression, and encryption and decryption.

The RRC layer is defined only in a control plane. Between the RRC layer of the UE 100 and the RRC layer of the eNB 200, a control message (an RRC message) for various types of setting is transmitted. The RRC layer controls the logical channel, the transport channel, and the physical channel in response to establishment, re-establishment, and release of a radio bearer. When there is a connection (RRC connection) between the RRC of the UE 100 and the RRC of the eNB 200, the UE 100 is in a connected state (RRC connected state), and otherwise, the UE 100 is in an idle state (RRC idle state).

A NAS (Non-Access Stratum) layer positioned above the RRC layer performs session management or mobility management, for example. The MME 300 and the ANDSF server 600 exchange NAS massages with the UE 100.

(Operation According to First Embodiment)

Next, an operation according to the first embodiment will be described.

(1) Operation Environment

Figure 6:
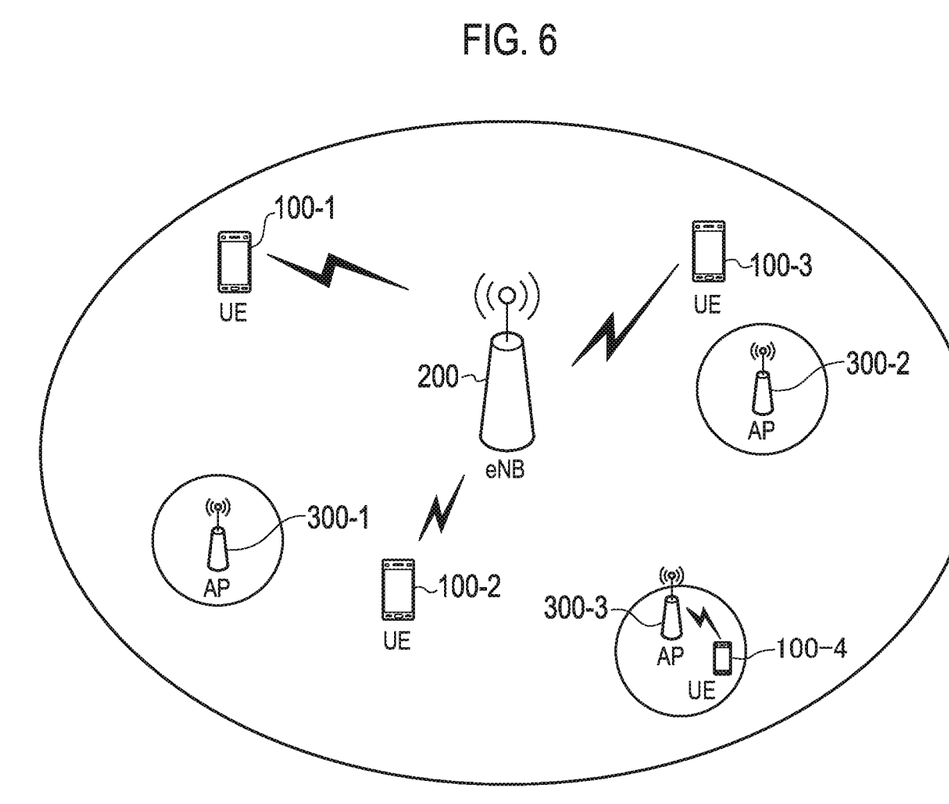
FIG. 6 is a diagram illustrating an operation environment according to the first embodiment to the third embodiment.

FIG. 6 is a diagram illustrating an operation environment according to the first embodiment. As shown in FIG. 6, a plurality of APs 300 are provided in a coverage of the eNB 200. Each of the plurality of APs 300 are an AP (Operator controlled AP) managed by an operator.

Further, a plurality of UEs 100 are located in the coverage of the eNB 200 and in the coverage of the AP 300. The UE 100 establishes a connection with the eNB 200, and performs cellular communication with the eNB 200. Specifically, the UE 100 exchanges a cellular radio signal including a traffic (user data) with the eNB 200. Alternatively, some UEs 100 may not establish a connection with the eNB 200.

When the eNB 200 establishes a connection with a large number of UEs 100, a load level of the eNB 200 increases. The "load level" means the degree of congestion in the eNB 200 such as a traffic load of the eNB 200 or usage of radio resources of the eNB 200. Here, when the exchange of traffic between the eNB 200 and the UE 100 is switched to the exchange of traffic between the AP 300 and the UE 100, it becomes possible to transfer (offload) the traffic load in the eNB 200 to the AP 300.

However, in order to keep the UE 100 to be in a state of being able to connect with the AP 300, it is necessary that the WLAN communication unit 112 of the UE 100 is constantly in the on state to continue an AP discovery process, resulting in an increase in power to be consumed in the UE 100. Therefore, when the information on the AP 300 is provided to the UE 100, it becomes possible to make efficient the AP discovery process performed by the UE 100 and restrain an increase in power to be consumed in the UE 100.

(2) Operation Content

When the UE 100 is offloaded from the eNB 200 to the AP 300, the UE 100 determines whether it is possible to be offloaded for each external connection-target network (APN: Access Point Name). An Offload-able APN list, which is information for determining whether it is possible to be offloaded for each APN, is notified from the network to the UE 100. Specifically, the list is notified from a network function such as the MME 500.

Here, whether it is possible to be offloaded in an APN not included in the Offload-able APN list is determined by the UE 100.

Specifically, the UE 100 according to the present embodiment can be connected to a plurality of radio access schemes, and includes: a receiver (processor 160 and cellular communication unit 111) that receives, from a network, an Offload-able APN list, which is a list to which priority of a radio access scheme to be used is set for each APN; a storage (memory 150) in which a RAN rule, which is a rule applied when a radio access scheme is selected, is stored; and a controller (processor 160) that determines, on the basis of the Offload-able APN list and the RAN rule, whether to change the radio access scheme to be used for connecting to the APN between cellular and WLAN, and when changing, establishes the connection with the APN via a target radio access scheme to be changed. When an APN is not listed in the Offload-able APN list, the controller determines whether to change the radio access scheme to be used for the connection with the APN in accordance with a predetermined condition.

Here, the RAN rule describes whether RSRP, RSRQ, a communication speed, a load situation, etc., of the used radio access scheme satisfy a previously configured condition. This is a rule where when the load situation of the eNB 200 is larger than a threshold value set in the RAN rule, for example, the radio access scheme is changed to WLAN.

Further, examples of the predetermined condition include: a condition that the UE 100 does not make a change to the WLAN when an APN to which connection can be made only when the cellular is used is concerned; a condition that the UE 100 determines a change from load situations of the cellular and the WLAN when an APN not dependent upon the radio access scheme is concerned; and a condition of in the process of moving or standing still.

Figure 7:
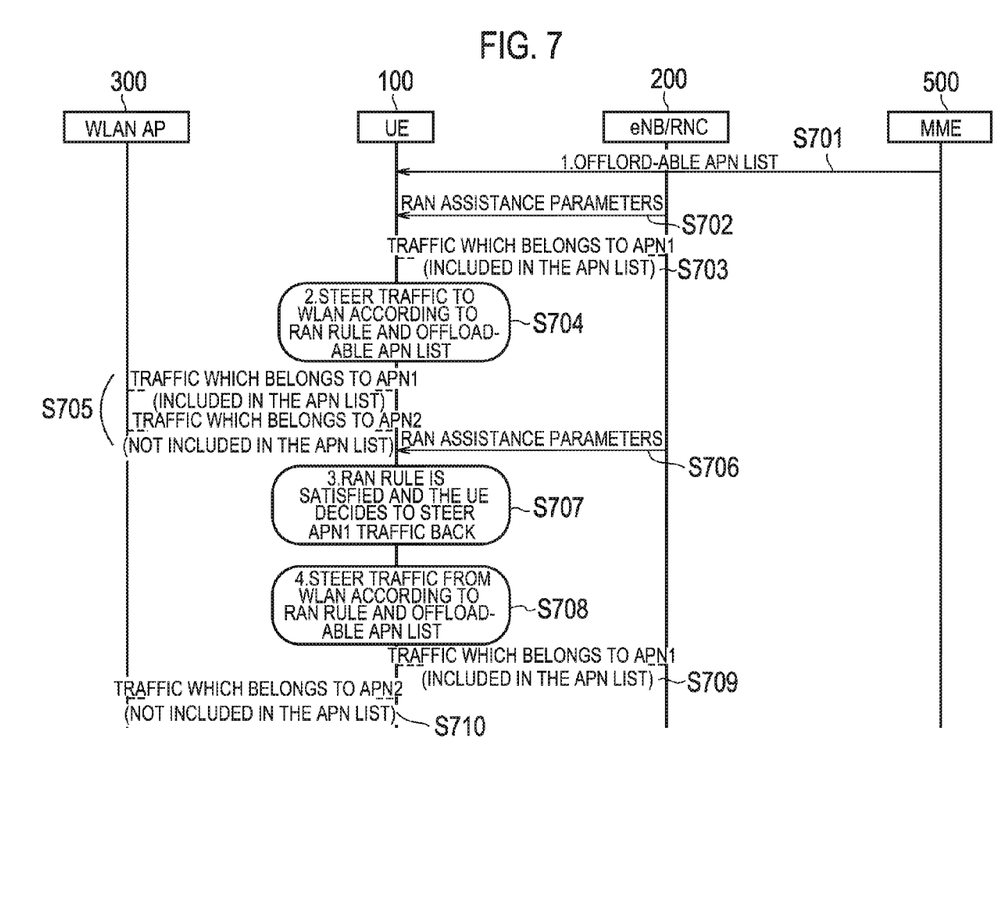
FIG. 7 is a sequence diagram according to the first embodiment.

By using FIG. 7, an operation sequence according to the present embodiment will be described.

The UE 100 receives the Offload-able APN list from the MME 500 (S701).

Further, the UE 100 receives RAN level assistance information (RAN Assistance Parameter) used for setting a condition of a RAN rule, from the eNB/RNC 200 (S702).

Here, communication is under progress with an APN1 by using the cellular (S703 Traffic which belongs to APN1). It is noted that the APN1 is included in the Offload-able APN list.

By using the RAN rule, the UE 100 determines to change the used radio access scheme of the APN1 included in the Offload-able APN list in order to be offloaded from the cellular to the WLAN (S704: Steer traffic to WLAN according to RAN rule and offload-able APN list).

The UE 100 changes the radio access scheme to be used for connecting to the APN1, from the cellular to the WLAN. Further, the UE 100 connects to an APN2 by using the WLAN. Here, the APN2 is not included in the Offload-able APN list (S705).

The UE 100 receives again a RAN Assistance Parameter from the eNB/RNC 200 (S706). On the basis of the received RAN Assistance Parameter, the RAN rule is reset.

Here, the RAN Assistance Parameter is generated on the basis of a radio situation of the eNB/RNC 200, and thus, when the RAN rule is set while the radio situation is reflected.

The UE 100 determines on the basis of the RAN rule to steer the traffic of the APN1 back to the cellular (S707: RAN rule is satisfied and the UE decides to steer APN1 traffic back). For example, when the load of the cellular decreases, the UE 100 determines to steer the traffic of the APN1 back to the cellular.

The UE 100 changes the radio access scheme used for connection to the APN1, from the WLAN to the cellular (S708: Steer traffic from WLAN according to RAN rule and offloadable APN list). As a result, when the UE 100 intends to establish a connection to the APN1, the UE 100 uses the WLAN (S709).

On the other hand, the UE 100 determines whether the APN2 not included in the Offload-able APN list complies with a predetermined condition, and selects to continue the communication by using the WLAN (S710). For example, the UE 100 compares throughput of the WLAN with that of the cellular, and when the WLAN is higher, the UE 100 continues to use the WLAN.

According to the present embodiment, it is possible to select the radio access scheme to be used by using the Offload-able APN list, and when the APN not included in the Offload-able APN list is concerned, the UE 100 is capable of using a suitable radio access scheme by selecting the radio access scheme to be used.

[Second Embodiment]

By using FIG. 8 to FIG. 10, a second embodiment will be described. It is noted that a description of parts overlapping the first embodiment will be not be provided, and a difference from the first embodiment will be mainly described.

Figure 8:
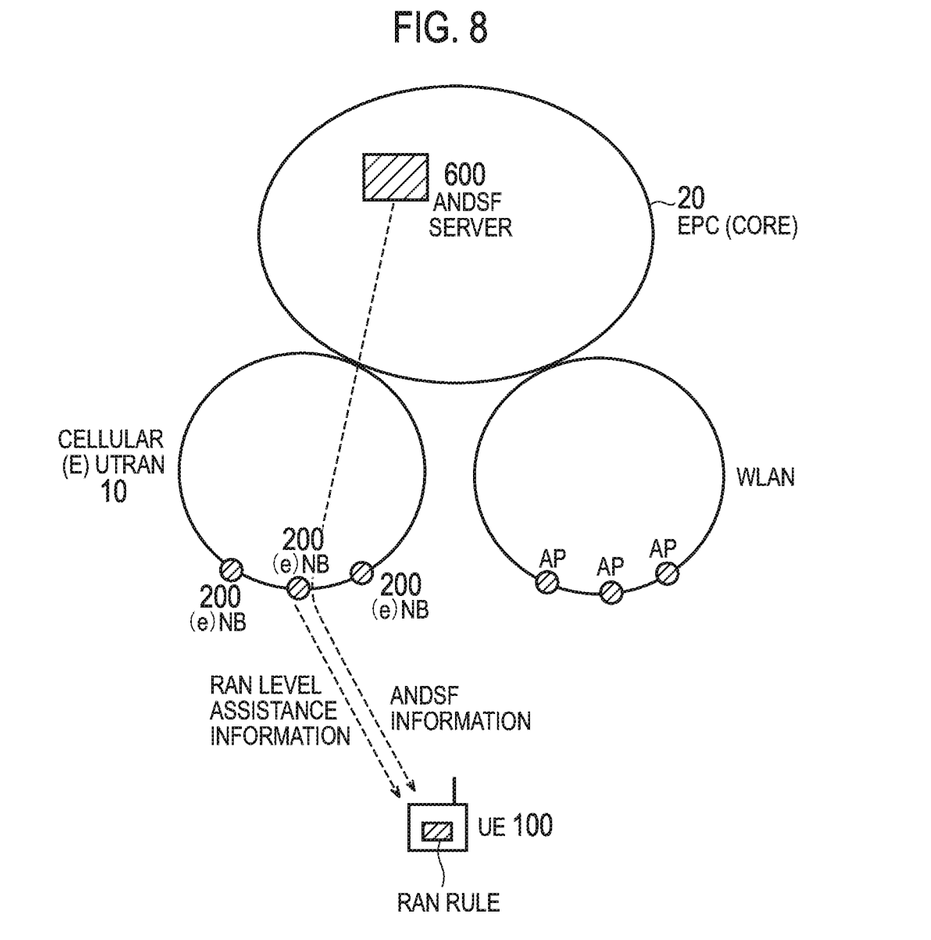
FIG. 8 is a system configuration diagram according to the second embodiment.

As shown in FIG. 8, the UE 100 according to the present embodiment determines which to use the WLAN or the cellular in radio access scheme, from the ANDSF received from the network and the RAN rule stored in the UE 100.

Here, the ANDSF is transmitted from an ANDSF server deployed in a network. The ANDSF includes ISRP (Inter System Routing Policy) which is information on a routing policy between systems. In the ISRP, it is possible to set a radio access scheme used for each IP flow.

On the other hand, the RAN rule is a rule for selecting a radio access scheme used for each APN, and is set on the basis of a radio situation such as a load of a radio access scheme, and thus, the UE 100 is capable of selecting the most appropriate radio access scheme in response to the radio situation.

Figure 9:
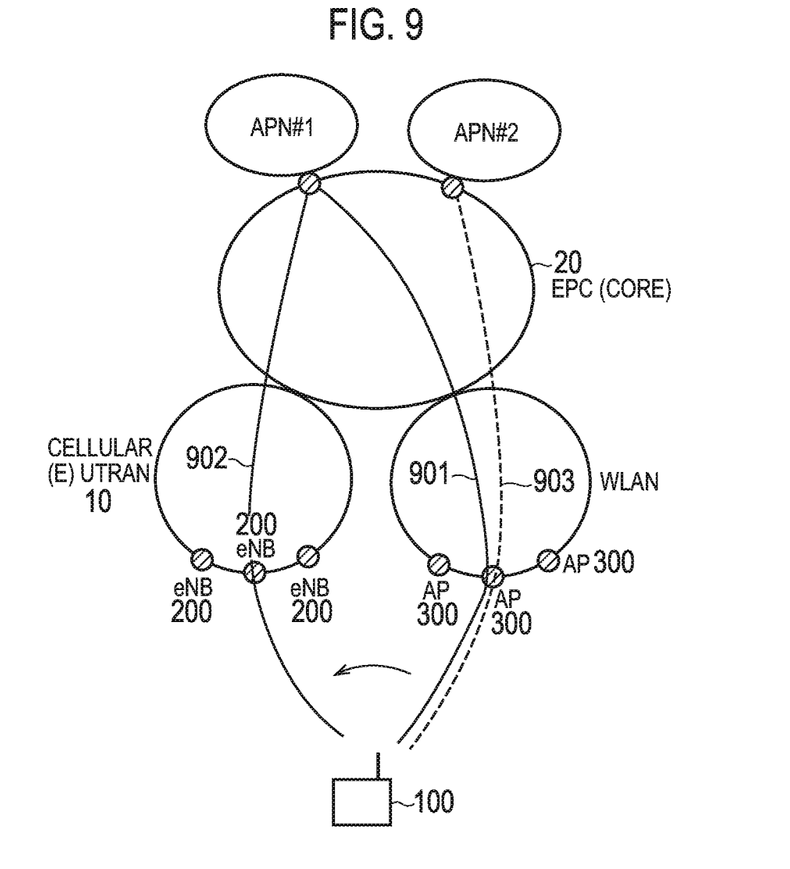
FIG. 9 is a system configuration diagram according to the second embodiment.
Figure 10:
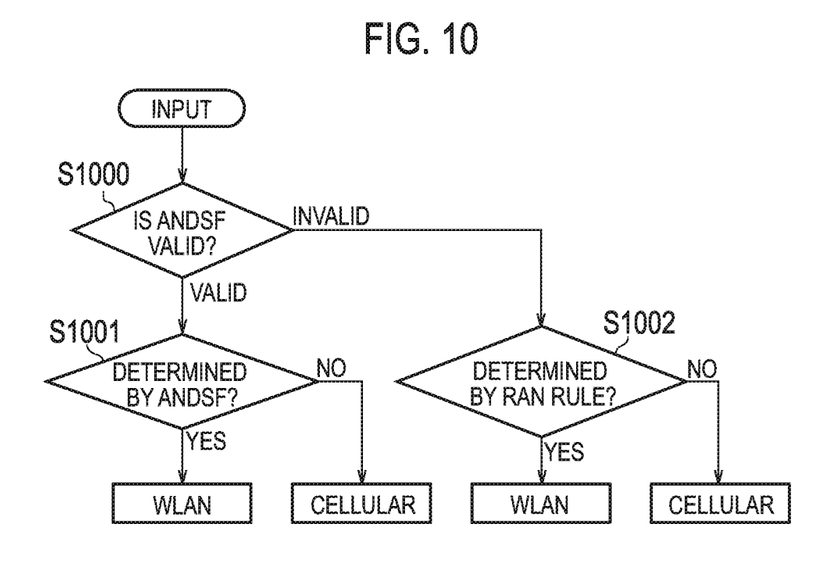
FIG. 10 is a flowchart according to the second embodiment.

For example, as shown in FIG. 9, the UE 100 uses the ANDSF or the RAN rule to change the connection to an APN #1 from the WLAN to the cellular (901 to 902), and is capable of continuously using the WLAN to an APN #2 (903).

Further, when the ISRP included in the ANDSF is used, it is possible to use a radio access scheme different from IP flows even when the connection to the same APN is concerned.

In a conventional scheme, when the UE 100 holds the ANDSF and the RAN rule, a method of applying the two rules is not regulated, and there is a concern that it is not possible to appropriately select the radio access scheme.

In the present embodiment, the RAN rule is applied when a predetermined condition is satisfied, while the UE 100 preferentially applies the ANDSF.

Specifically, the UE 100 can be connected to a plurality of radio access schemes, and includes: a receiver (cellular communication unit 111 and processor 160) that receives ANDSF from a network; a storage (memory 150) in which a RAN rule is stored; and a controller (processor 160) that selects either one of cellular or WLAN from the ANDSF and the RAN rule and uses the selected radio access scheme to establish a connection with the APN. The controller preferentially uses the ANDSF to change the radio access scheme; when a predetermined condition is satisfied, the controller changes the radio access scheme on the basis of the RAN rule without using the ANDSF.

Here, in the ANDSF, when a function itself of specifying a radio access scheme to be used is not set, and it is not possible to select a radio access scheme because some functions are set inactive, the UE 100 may determine that the predetermined condition is satisfied. The UE 100 selects the access scheme to be used by using the RAN rule.

Further, when the ANDSF is set so that a radio access scheme to be used is selected on the basis of at least either one of a time zone and a camp-on location, the UE 100 may determine that the predetermined condition is satisfied.

For example, in a time zone or a camp-on location (urban area) where cellular traffic is large, even when the setting in which the WLAN is preferentially used is the ANDSF, the actual cellular traffic may be small. In this case, the UE 100 more preferably selects a radio access scheme by using the RAN rule set by using RAN level assistance information, which is an actual radio situation.

It is noted that the RAN rule is configured so that the most appropriate radio access scheme is selected on the basis of a cellular of a radio access scheme to be selected, a load situation of WLAN, and radio quality.

Further, normally the ANDSF is configured to be set by a home network (HPLMN) of the UE 100. On the other hand, the RAN level assistance information for setting the RAN rule is notified from the eNB 200 in which the UE 100 exists. When the UE 100 is roaming, it is preferable that a radio access scheme is selected by using the RAN rule designated by the eNB 200 in which the UE 100 exists, rather than using the ANDSF set by the HPLMN.

Thus, when the UE 100 is roaming, the UE 100 may determine that the predetermined condition is satisfied.

By using FIG. 10, a determination flow when the ANDSF and the RAN rule are applied will be described.

The UE 100 selects the radio access scheme for each APN or for each IP flow in the APN.

The UE 100 determines for the APN or the APN flow to be determined whether a valid ANDSF is set (S1000). Here, the "valid ANDSF" applies when the above-described predetermined condition is not satisfied.

When the ANDSF is valid, the UE 100 uses the ANDSF to select which to use, as a radio access scheme, WLAN or cellular (S1001).

On the other hand, when the ANDSF is invalid, the UE uses the RAN rule to select to use either one of the radio access schemes (S1002).

As described above, according to the embodiment-based disclosure, the UE 100 is capable of appropriately selecting a radio access scheme when the UE 100 holds the ANDSF and the RAN rule.

[Third Embodiment]

Figure 11:
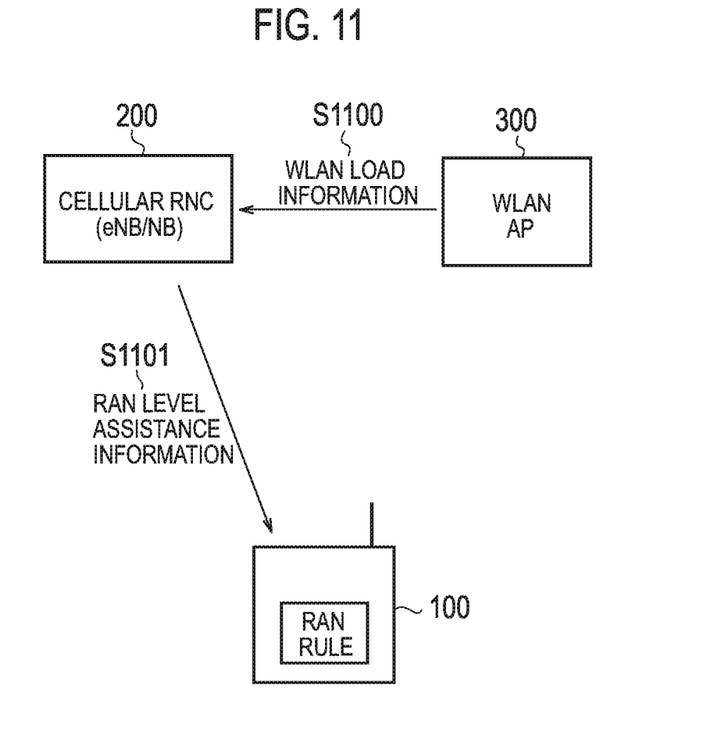
FIG. 11 is a configuration diagram according to the third embodiment.

By using FIG. 11, a third embodiment will be described. It is noted that a description of parts overlapping the first and second embodiments will be not be provided, and a difference from the first and second embodiments will be mainly described.

In a RAN rule according to the present embodiment, the eNB 200 does not generate the RAN level assistance information only from a radio situation of a cell managed by the eNB 200, but generates the RAN level assistance information also in consideration of a load situation of the AP 300 that may be selected.

More specifically, when the eNB 200 acquires load information of the AP 300, the eNB 200 generates the RAN level assistance information from the load information. The eNB 200 notifies the user terminal of the generated RAN level assistance information. The UE 100 uses the RAN level radio assistance information to set the RAN rule, and in accordance with the set selection rule, selects the radio access scheme.

Further, the UE 100 according to the present embodiment is characterized by including: a receiver (cellular communication unit 111 and processor 160) that receives RAN level assistance information; and a controller (processor 160) that selects a radio access scheme from the RAN level assistance information, wherein the RAN level assistance information is generated from load information of the AP 300 acquired by the eNB 200 from the AP 300, and the controller selects the radio access scheme on the basis of the set radio access scheme selection rule.

Here, the eNB 200 may directly acquire, from the AP 300, the load information of the AP 300, and may indirectly acquire the load information via a network device.

By using FIG. 11, an operation flow according to the present embodiment will be described.

The eNB 200 acquires the load information of the AP 300, from the AP 300 (S1100).

It is noted that when the type of cellular is not LTE (EUTRAN) but 3G (UTRAN), RNC acquires the load information of the AP 300.

The eNB 200 generates the RAN level assistance information from the acquired load information of the AP 300, and notifies the UE 100 thereof (S1101).

The UE 100 sets the RAN rule by using the notified RAN level assistance information, and selects a radio access scheme. Specifically, the UE 100 determines whether or change the radio access scheme to be used, from the LTE to the WLAN.

[Other Embodiments]

The above-described first embodiment to third embodiment may be performed separately and independently and may also be performed through a combination thereof.

In the above-described embodiments, as one example of a cellular communication scheme, the LTE scheme is described; however, the present disclosure is not limited to the LTE scheme, and the present disclosure may be applied to schemes other than the LTE scheme.

Further, as an example of a radio access scheme other than the cellular communication scheme, the WLAN is described; however, the present disclosure is not limited to the WLAN and may of course be applied to a radio access scheme such as WiMAX.

[Appendix 1]

Below, the additional notes of the embodiments will be described.

(1. Introduction)

In the previous meeting, SA2 informed RAN2 of its decision for traffic routing from RAN to WLAN without ANDSF, i.e. the MME/SGSN indicates to the UE in NAS signalling which APNs must not be offloaded or alternatively which APNs may be offloaded to WLAN. However granularity of traffic routing from WLAN to RAN is still unclear. This appendix offers several alternatives for traffic routing from WLAN to RAN without ANDSF case with various level of granularities.

(2. Discussion)

(2.1. Traffic Routing from WLAN to RAN Using RAN Rule)

If UE applies ANDSF functions, traffic routing from WLAN to RAN is already clear. For example, ISMP capable UE would steer all traffics from WLAN to RAN, while ISRP capable UE may steer traffics at the IP flow level depending on what is defined in the ANDSF functions. However, if ANDSF is unavailable to the UE, and RAN rules is applied, it has not been decided how traffic should be steered from WLAN to RAN and whether the decision should be based on RAN rules. This issue may also be applicable for the case when the UE is provisioned with both RAN rules and ANDSF but none of the available ANDSF rules are valid, since this case is still 1-FS according to SA2.

The understanding is that the access stratum in the UE shall indicate to the upper layers when RAN specified conditions are satisfied for a time interval TsteeringWLAN. For traffic routing from RAN to WLAN, it is already agreed that the MME indicates to the UE via NAS signalling whether the traffic is offload-able or not. However, for traffic routing from WLAN to RAN, there is the possibility that the UE may not be able to receive NAS signalling. Therefore, it is still unclear whether it is necessary for the network to specify (based on APN) which traffic should be steered back to 3GPP and whether it is necessary for the UE to have the most up-to-date traffic steering information from the network.

The following three alternatives should be considered for traffic routing from WLAN to RAN.

Alt.1: UE steers all traffics from WLAN to RAN.

This is the simplest alternative. Once the RAN specified rule is satisfied for traffic routing from WLAN to 3GPP, the UE will steer all traffic to RAN. This alternative also reduces the UE's power consumption since the UE does not need to be connected to both RAN and WLAN simultaneously.

Alt.2: Traffic selected to be steered to RAN is up to UE implementation.

With this alternative, there is no need to define traffic to be steered with RAN rules. However, it is still necessary for the RAN rule to be satisfied for traffic steering from WLAN to RAN before the UE is allowed to steer any traffic to RAN.

If this alternative is agreed, the statement "UE behaviour is up to UE implementation in the direction from WLAN to 3GPP RAN" may be described in Stage 2.

Alt.3 UE steers traffic from WLAN to RAN according to offloadable APN list.

UE steers traffic back to 3GPP, which once belonged to offloadable APN. For example, the following steps may be applied for the selection of traffic to be steered to RAN.

a) The network entity (e.g. MME, P-GW) specifies a subset of all offloadable APNs to be steered from WLAN to RAN.

b) UE steers traffic to RAN based on the specified APNs as long as the RAN rule is satisfied. It is assumed that all traffic belonging to the specified APNs are steered back.

c) For the remaining traffic not mapped to any of the specified APNs, the UE may decide autonomously whether they should be steered to the RAN.

The only difference between Alt 3 and what is already specified for the traffic steering from RAN to WLAN is that the UE also gets to decide whether the remaining traffic not on the APN list should be steered to RAN.

It may be assumed that the APN list isn't changed frequently, so it may be considered semi-static. In general, the offloadable APN list can be different for each traffic steering direction, i.e. MME can provide both offloadable APN list from RAN to WLAN and offloadable APN list from WLAN to RAN. However it is questionable if there is any benefit to distinguish the APN lists. In comparison, Alt 1 provides an easy solution. It is testable, and it isn't necessary for the UE to be connected to both RAN and WLAN simultaneously. Alt 2 provides more flexibility to the UE, but this functionality cannot be verified through testing. Although Alt 3 provides the RAN full control of traffic steering in both directions, it is also the most complicated of all the alternatives.

Considering the pros and cons of the three alternatives, Alt.1 appears to provide the most reasonable compromise.

Proposal 1: UE shall steer all traffics from WLAN to RAN when RAN specified rules are satisfied.

(3. Conclusion)

This contribution discusses and clarifies traffic routing with RAN rules in the direction from WLAN to RAN.

[Appendix 2]

(1. Introduction)

The way forward on Multi-RAT Joint coordination was agreed as follows

1. General requirements and definitions for Traffic Steering and Spectrum re-allocation definition 2. Use cases for Coordination Involving 3GPP/WLAN The further discussion on 3GPP/WIFI interworking will be based on following steps.

1) identify the potential scenarios/use cases;
2) investigate what information needed;
3) define the way to obtain the information.

It is noted that the discussion should regard to RAN2/SA2 works.

On the basis of agreed discussion steps, this paper provides additional scenarios/use cases identified as the step 1.

(2. Additional Scenarios/Use Cases Involving WLAN)

(2.1. Current Potential Use Cases)

At the last meeting, potential use cases were discussed and the minutes captured the following texts;

Use cases:

1: Seamless mobility from WLAN to 3GPP: mobility without service interruption, any SA2 work on service continuity?

2: Appropriate UE steering from WLAN to 3GPP

3: Resolving mobility decision conflict

4: Automatic WLAN AP/AC parameters collection/setting

In the following sections, we would propose additional scenarios/use cases.

(2.2. 3GPP/WLAN Radio Interworking Complement Scenario)

In this section we provide some possible use cases to complement the mechanism in 3GPP/WLAN Radio Interworking WI discussed in RAN2.

(2.2.1. Network Selection/Traffic Enhancements)

At RAN2 #85-bis meeting, it was agreed that the actual decision of offloading can be determined by a single set of RAN assistance parameters provided by the eNB/NB.

Agreements

1. For the RAN mechanism a single set of RAN rules with one set of RAN assistance parameters that determines access selection and traffic routing. It is up to the UE whether it associates with the Access Point only when the rule is met or already before. If multiple WLANs meet the criteria, it is up to the UE implementation which one to choose (or follow the absolute priorities if such are considered necessary and signalled (PPS)).

Observation 1: eNB/NB has to configure RAN assistance parameters used in RAN rules to determine network selection/traffic steering to/from WLAN.

Obviously, the role of eNB/NB should be to provide precise RAN assistance parameters for the appropriate decision of access network and/or traffic steering. In the case, a possible problem is, how the eNB/NB decides suitable RAN assistance parameters, taking into account current loads in eNB/NB and WLAN APs. The eNB/NB should have the capability to gather information, e.g. load information and/or maximum achievable data rate, from WLAN AP or AC, in order to adjust RAN assistance parameters before signalling to the UE, e.g. comparing both own load and WLAN load.

Proposal 1: RAN3 should consider the precise control of network selection/traffic steering use case to facilitate eNB/NB to adjust RAN assistance parameters signalled to the UE.

Proposal 2: If Proposal 1 is acceptable, RAN3 should discuss the method for the eNB/NB to obtain at least load information and maximum achievable data rate from WLAN AP/AC.

(2.2.2. Offloading Granularity)

We analyzed that RAN3 may enhance the granularity of traffic steering in the RAN solution because RAN2 agreed as follows;

Agreements

2. RAN solution without ANDSF supports APN level offload granularity only. [ . . . ]

Currently the RAN solution provided by RAN2 may be considered suboptimal, since it's common view that smaller granularity of traffic steering can bring more gains in WLAN interworking, from perspective of e.g. load balancing between 3GPP RAN and WLAN.

Comparing to Core Network solutions from granularity point of view, MAPCON (Multi Access PDN Connectivity) can be similar with APN level offload above. However, RAN solution does not have the capability for IP flow level offloading, while CN has IFOM (IP Flow Mobility) to support it. On the other hand, RAN has the knowledge of a bearer, so RAN can use the information for bearer level steering which has not been provided by CN. Therefore, RAN 3 should consider enhancing the steering granularity of the RAN solution in discussed in RAN2.

Observation 2: The current RAN solution has a limitation in terms of steering granularity.

Observation 3: There are four steering granularities, per-IP flow, per-bearer, per-APN and per-UE in precision order, while RAN2 solution has just per-APN steering.

Proposal 3: RAN3 should consider the steering granularity enhancements use case to facilitate flexible traffic steering.

If Proposal 3 is acceptable, we should consider the direction of the traffic steering, i.e. from 3GPP RAN to WLAN and from WLAN to 3GPP.

In case traffic is offloaded from 3GPP RAN to WLAN, it may be desirable for the eNB/NB to obtain the QoS control capability of specific WLAN AP/AC in order for the eNB/NB to decide whether GBR traffic, e.g. VoIP and/or video streaming, can be offloaded to WLAN or not. As is well known, today's WLAN has the optional capability of QoS control as IEEE 802.11e. If the option in WLAN can be assumed, the eNB/NB will perform the traffic steering more efficiently without degradation to the current carrier-grade level QoS.

Observation 4: For offloading from RAN to WLAN, the QoS control capability of specific WLAN AP/AC should be provided to the RAN.

As for the onloading case, i.e. traffic steering from WLAN to 3GPP RAN, the QoS characteristics of the selected traffic may be useful to map the WLAN traffic into 3GPP traffic in the eNB/NB.

Observation 5: For onloading from WLAN to RAN, the QoS characteristics of the selected traffic to be steered should be provided to the RAN.

(2.3. WLAN AP Deployment)

A practical multi-RAT deployment was introduced in the contribution in RAN2. According to the contribution, tens of APs are deployed per 3GPP cell in average, while it may be hundreds of APs assuming non-uniform deployment, e.g. in dense urban. For some time in the future the number is expected to be increased, so it may surpass the assumption for H(e)NB deployment.

Observation 6: The number of WLAN APs can be substantial and will only increase significantly over time.

It is also expected that signalling load in a network and/or processing load in a control node will become an issue for Multi-RAT joint coordination involving WLAN, similar to the H(e)NB case.

Proposal 4: Signalling and processing load should be considered for the use case with large number of WLAN AP deployment.

(2.4. 3GPP Level Security Over WLAN)

Currently, traffic which is initiated in 3GPP network is often offloaded to WLAN network including trusted WLAN access and untrusted WLAN access, where the untrusted WLAN access does not ensure security. 3GPP CN has developed a solution defining ePDG (Evolved Packet Data Gateway) to facilitate that the UE establishes a secure tunnel, i.e. IPsec, before the traffic routing. However, from RAN's perspective, it cannot directly control the security of the traffic to be steered and it may be inefficient for the tunnelling to be established whenever traffic steering to WLAN is needed. Therefore, a more flexible security solution for RAN should be discussed in this SI.

Proposal 5: RAN3 is asked to discuss whether untrusted WLAN should be handled or not.

Clearly, other modifications and manners of practicing this invention will occur readily to those of ordinary skill in the art in view of these teachings. The above description is illustrative and not restrictive. This invention is to be limited only by the following claims, which include all such modifications and manners of practice when viewed in conjunction with the above specification and accompanying drawings. The scope of the invention should, therefore, be determined not with reference to the above description, but instead should be determined with reference to the appended claims along with their full scope of equivalents.

INDUSTRIAL APPLICABILITY

The present disclosure is useful for communication fields.

The invention claimed is:

1. A user terminal capable of using an Evolved-UMTS Terrestrial Radio Access Network (E-UTRAN) and a Wireless Local Area Network (WLAN), comprising:
   a storage configured to store a Radio Access Network (RAN) rule for selecting a radio access scheme with Access Point Name (APN) granularity, among the E-UTRAN and the WLAN;
   a receiver configured to receive an Access Network Discovery and Selection Function (ANDSF) rule from the E-UTRAN of the user terminal, wherein the ANDSF rule does not include a specific function of selecting the radio access scheme to be used; and
   a controller configured to
      perform a roaming from the E-UTRAN of the user terminal to a visited cellular network, and
      select a selection rule, from among the ANDSF rule and the RAN rule, to be applied to change the network,
   wherein in response to the ANDSF rule having no specific function for selecting the radio access scheme to be used, the controller selects the RAN rule in a case where the user terminal has both the ANDSF rule and the RAN rule while the user terminal is in the visited cellular network.

2. An apparatus for controlling a user terminal capable of using an Evolved-UMTS Terrestrial Radio Access Network (E-UTRAN) and a Wireless Local Area Network (WLAN), the apparatus comprising:
   processor configured to
      store a Radio Access Network (RAN) rule for selecting a radio access scheme with Access Point Name (APN) granularity, among the E-UTRAN and the WLAN;
      receive an Access Network Discovery and Selection Function (ANDSF) rule from the E-UTRAN of the user terminal, wherein the ANDSF rule does not include a specific function of selecting the radio access scheme to be used;
      perform a roaming from the E-UTRAN of the user terminal to a visited cellular network, and
      select a selection rule, from among the ANDSF rule and the RAN rule, to be applied to change the network,
      wherein
      in response to the ANDSF rule having no specific function for selecting the radio access scheme to be used, the RAN rule is selected in a case where the user terminal has both the ANDSF rule and the RAN rule while the user terminal is in the visited cellular network.

3. A method for a user terminal capable of using an Evolved-UMTS Terrestrial Radio Access Network (E-UTRAN) and a Wireless Local Area Network (WLAN), comprising:
   storing a Radio Access Network (RAN) rule for selecting a radio access scheme, among the E-UTRAN and the WLAN;
   receiving an Access Network Discovery and Selection Function (ANDSF) rule for from the E-UTRAN of the user terminal, wherein the ANDSF rule does not include a specific function of selecting the radio access scheme to be used;
   performing a roaming from the E-UTRAN of the user terminal to a visited cellular network, and
   selecting a selection rule, from among the ANDSF rule and the RAN rule, to be applied to change the network,
   wherein
   in response to the ANDSF rule having no specific function for selecting the radio access scheme to be used, the RAN rule is selected in a case where the user terminal has both the ANDSF rule and the RAN rule while the user terminal is in the visited cellular network.

* * * * *